United States Patent [19]

Sandberg et al.

[11] Patent Number: 4,505,601
[45] Date of Patent: Mar. 19, 1985

[54] RETAINER BEARING AND BEARING ASSEMBLY FOR A WINDOW OPERATOR AND ASSEMBLY METHOD AND TOOL

[75] Inventors: Christopher T. Sandberg; Eugene L. Mosher, both of Owatonna, Minn.

[73] Assignee: Truth Incorporated, Owatonna, Minn.

[21] Appl. No.: 466,879

[22] Filed: Feb. 16, 1983

[51] Int. Cl.³ ............................................. F16C 35/02
[52] U.S. Cl. .......................................... 384/428; 29/511
[58] Field of Search ................ 29/509, 511; 403/320; 411/276, 277, 281, 283, 284, 333–336; 384/276, 280, 295, 428, 439, 129

[56] References Cited

U.S. PATENT DOCUMENTS

| | | | |
|---|---|---|---|
| 890,339 | 6/1908 | Cooper | 411/336 |
| 1,298,469 | 3/1919 | De Young et al. | 411/336 |
| 2,284,260 | 5/1942 | Castellanos | 29/148.2 |
| 2,438,744 | 3/1948 | Flynn | 81/10 |
| 2,644,350 | 7/1953 | Regimbald | 29/511 X |
| 3,254,690 | 6/1966 | Neuschotz | 411/334 |
| 4,095,327 | 6/1978 | Hartmann | 29/509 |
| 4,125,298 | 11/1978 | Heurich et al. | 308/189 R |
| 4,253,276 | 3/1981 | Peterson et al. | 49/249 |
| 4,445,794 | 5/1984 | Sandberg | 384/428 |

Primary Examiner—John Petrakes
Assistant Examiner—David Werner
Attorney, Agent, or Firm—Wood, Dalton, Phillips, Mason & Rowe

[57] ABSTRACT

The bearing assembly has an externally-threaded retainer bearing threaded into a housing of deformable metal for rotatably supporting and maintaining a worm gear shaft in position. The retainer bearing has a plurality of flat sides with a spanner wrench slot at the outer end of each side whereby a flat side and spanner wrench slot of the retainer bearing can be located at a particular location relative to the housing and material of the housing is deformed into the space between the flat side of the retainer bearing and the threaded bore of the housing as well as into the spanner wrench slot to securely lock the retainer bearing in position.

6 Claims, 11 Drawing Figures

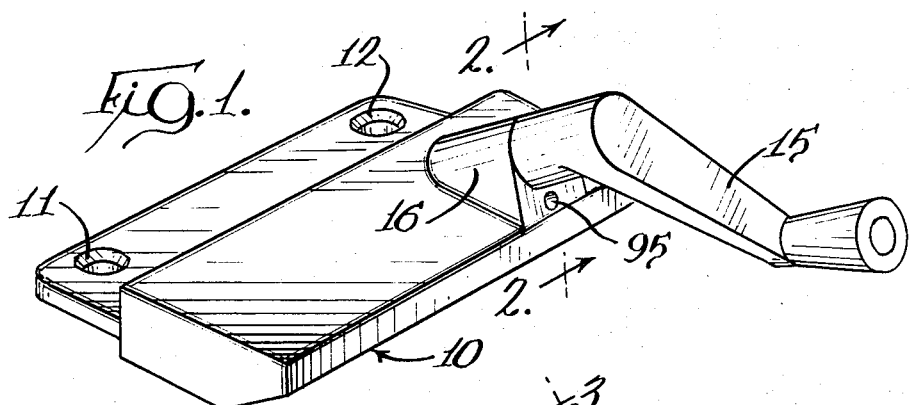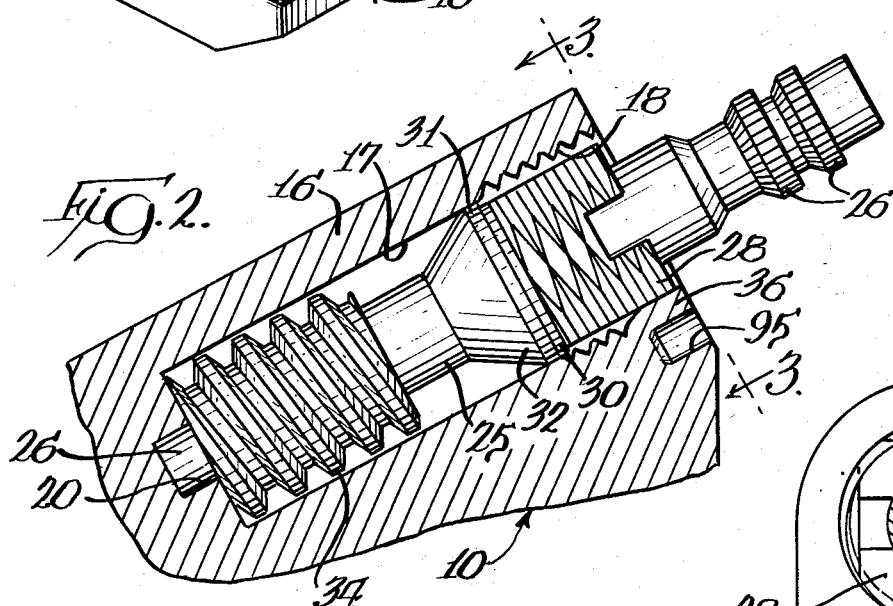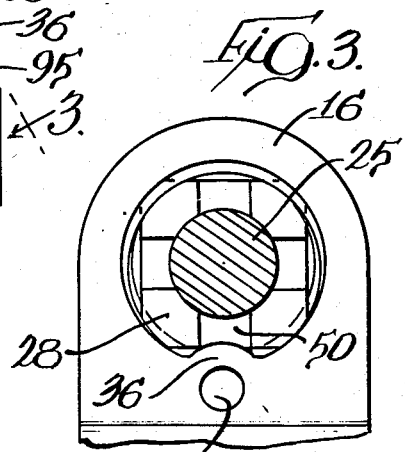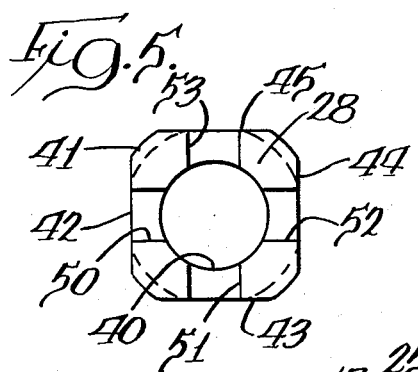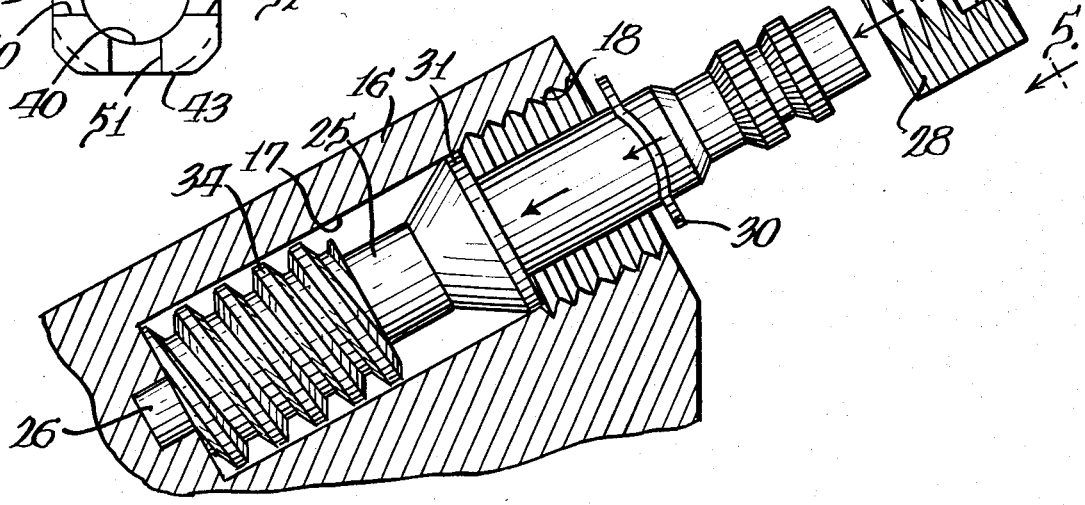

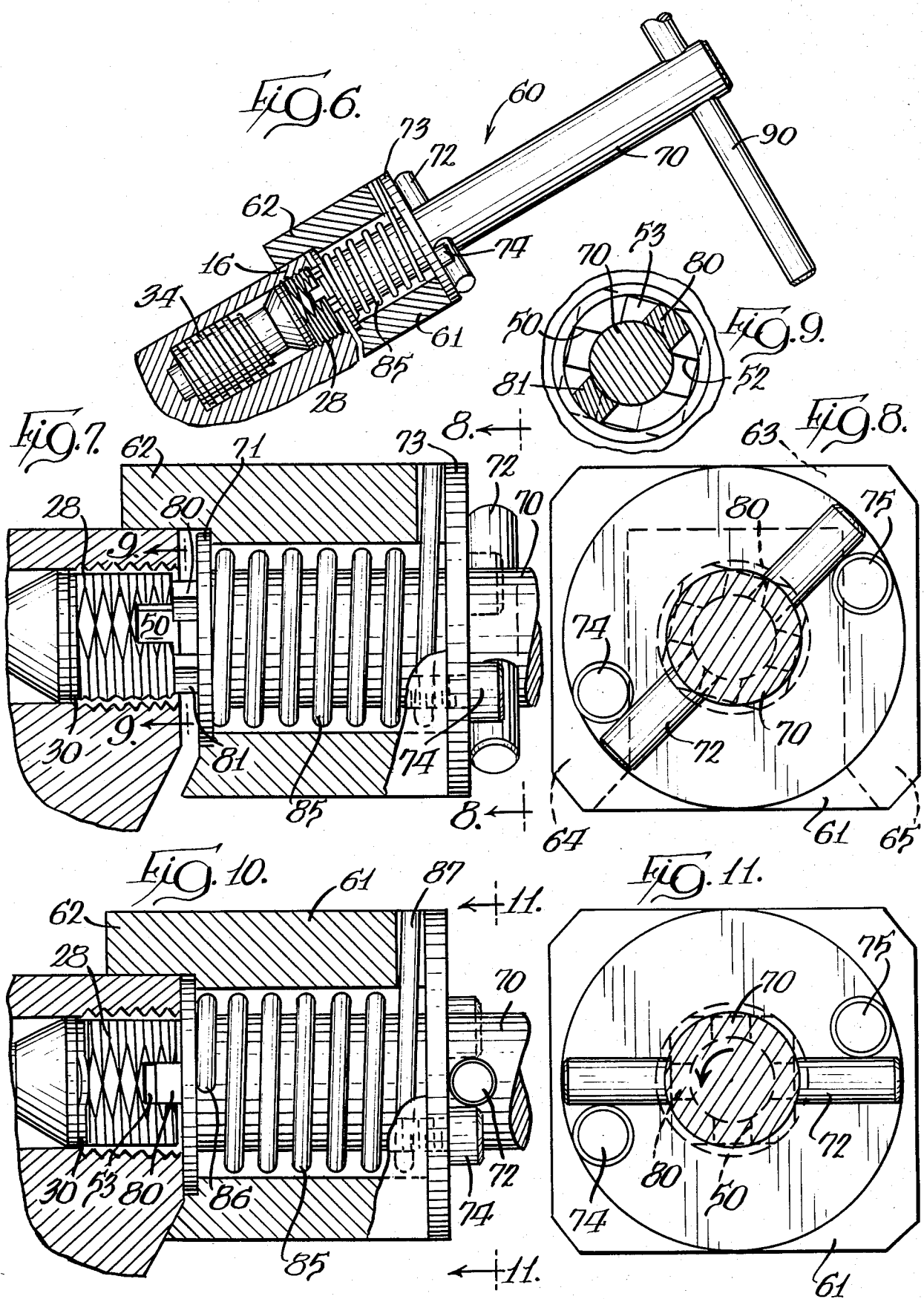

RETAINER BEARING AND BEARING ASSEMBLY FOR A WINDOW OPERATOR AND ASSEMBLY METHOD AND TOOL

BACKGROUND OF THE INVENTION

This invention pertains to a bearing assembly including a unique retainer bearing which is locked to a housing in a manner to prevent axial and radial displacement of a worm gear shaft rotatably mounted in the bearing and to an assembly method and tool used in the method.

One example of the utility of the bearing assembly is in use in a window operator wherein rotation of a worm gear shaft having a worm gear engaging a worm wheel on an operator arm causes movement of a window. A structure of this general type is shown in U.S. Pat. No. 4,253,276, owned by the assignee of this application. In the prior structure, after the retainer bearing was threaded into position within the housing, it was held in place by use of an additional structural element, such as a pin, wedged between the threads of the bearing and the housing. This required handling of an additional structural element and the assembly steps associated therewith, with a resulting increase in the cost of the product.

One system for avoiding the use of the pin to lock the retainer bearing to the housing is shown in U.S. Pat. No. 4,445,794, wherein the retainer bearing is provided with a discontinuous external thread. Rotation of the retainer bearing, after being fully seated within the bore of a housing, causes stripping of the softer threads of the housing which locks the retainer bearing in the housing.

The present invention avoids the use of the pin to lock the retainer bearing in the housing and relies upon a special shaping of the exterior of the retainer bearing and location of a specially-shaped part of the retainer bearing at a particular location of the housing whereby a limited amount of material of the housing can be deformed, by staking, into interlocked relation with the specially-shaped part of the retainer bearing.

SUMMARY OF THE INVENTION

Primary features of the invention are to provide a unique retainer bearing, a new and improved bearing assembly for a window operator and assembly method and tool for use in the method.

A new and improved retainer bearing is provided which is mountable in a bore and which has an external thread and a plurality of flat sides with a major part of the thread removed and an equal number of spanner wrench slots at an end thereof associated one with each of the flat sides. The retainer bearing is rotated within a threaded bore to bring a spanner wrench slot and a flat side to a particular location for flow of housing material into the space between the wall of the bore and the flat side of the retainer bearing as well as into the associated spanner wrench slot to lock the retainer bearing in position.

More particularly, the bearing assembly comprises a housing having a deformable metal part and having a bore with an internal thread adjacent the outer end thereof, a retainer bearing threaded into the bore and having a flat side and a spanner wrench slot at an end of said flat side located at a predetermined rotative position in the bore and a localized deformation of housing material at a stake location on the housing extending toward said flat and into said spanner wrench slot at the stake location to lock the retainer bearing in the housing.

The bearing assembly is usable as part of a window operator wherein the housing is part of the operator and a worm gear shaft is rotatably supported by the retainer bearing and the retainer bearing has a plurality of flat sides, each with a spanner wrench slot associated therewith whereby the retainer bearing can be advanced into the housing bore to a fully-seated position and, thereafter, is rotatably backed-off by a tool which frees the worm gear shaft for rotation and brings one of the flat sides of the retainer bearing and an associated spanner wrench slot accurately to said stake location.

In assembling the retainer bearing with associated structure and into a bore of a deformable metal housing, with the bore having an internal thread adjacent an outer end thereof, the method comprises placing an externally-threaded retainer bearing onto a worm gear shaft and threading the retainer bearing into the internal thread of the housing bore to a fully-seated position, rotatably backing-off said retainer bearing from the bore less than one revolution to align a particular part of the retainer bearing with a particular location on the housing, and staking said housing at said location to flow housing metal into interlocking engagement with a particularly-shaped part of the retainer bearing.

The assembly method is facilitated by use of a special tool having a guide block shaped to fit onto the housing in only one position, drive means rotatably mounted in said guide block having a pair of spanner teeth for engagement in a pair of spanner wrench slots in the retainer bearing, and means defining a stop to limit rotation of said drive means relative to said guide block wherein a flat side of the retainer bearing and a spanner wrench slot of the retainer bearing are brought into juxtaposition with a stake area on the housing.

BRIEF DESCRIPTION OF THE DRAWINGS

FIG. 1 is a perspective view of a window operator embodying the invention;

FIG. 2 is a section, on an enlarged scale, taken generally along the line 2—2 in FIG. 1 and with the handle removed;

FIG. 3 is a section, taken generally along the line 3—3 in FIG. 2;

FIG. 4 is a sectional view, similar to that shown in FIG. 2, and illustrating an intermediate step in the assembly operation;

FIG. 5 is an end view of the retainer bearing, taken along the line 5—5 in FIG. 4;

FIG. 6 is a sectional view, similar to FIG. 4, showing a later step in the assembly operation in the use of the special tool;

FIG. 7 is an enlarged fragmentary view of the structure shown in FIG. 6 and with parts broken away;

FIG. 8 is an end view of the structure shown in FIG. 7 and taken along the line 8—8 in FIG. 7;

FIG. 9 is a sectional view, taken along the line 9—9 in FIG. 7;

FIG. 10 is a view, similar to FIG. 7, showing the retainer bearing in final position; and FIG. 11 is an end view of the structure shown in FIG. 10 and as viewed along the line 11—11 in FIG. 10.

DESCRIPTION OF THE PREFERRED EMBODIMENTS

The window operator is shown generally in FIG. 1 and has a housing, indicated generally at 10, formed of a deformable metal, such as zinc. The housing is mountable on a window frame by attachment means extending through openings 11 and 12 in the housing and a rotatable handle is operable to move an operator arm (not shown) which is connectable to a window sash for positioning of the sash within the window frame. A window operator of this type is shown in more detail in U.S. Pat. No. 4,445,794, and the disclosure thereof is incorporated herein by reference.

The housing 10 has a raised section 16 which is generally U-shaped in cross section and which has an internal bore 17 with an internal thread 18 at the outer end thereof. A closed end of the bore 17 has a recess 20.

A worm gear shaft 25 is rotatably mounted in the bore 17 with a reduced diameter end 26 rotatably mounted in the recess 20. The worm gear shaft 25 extends outwardly beyond the housing, with an outer end receiving a tubular end of the handle 15 and with the handle being secured to the outer end of the worm gear shaft by the splines 26. An intermediate part of the worm gear shaft is rotatably supported by a retainer bearing 28 of brass or the like and having an external thread which threads into the internal thread 18 of the bore 17. The retainer bearing engages one side of a wave washer 30 and the opposite side of the wave washer engages a shoulder 31 defined by a frusto-conical section 32 of the worm gear shaft. A worm gear 34 on the worm gear shaft rotates therewith and meshes with a worm wheel (not shown) associated with an arm of the window operator and as shown in my prior copending application previously referred to.

The retainer bearing 28 permits free rotation of the worm gear shaft 25 while holding the worm gear shaft against radial and axial movement. The retainer bearing 28 is locked in position by upset housing material 36 resulting from deformation of the deformable material of the housing 10 by a staking process more particularly described hereinafter.

An important feature of the invention is the construction of the retainer bearing 28 which enables secure locking of the retainer bearing in position with only localized deformation of the housing material. The retainer bearing has a central opening 40 to rotatably receive the worm gear shaft 25 and has the previously-mentioned external thread 41. The retainer bearing is formed with four flat sides 42-45 which, in effect, render the thread 41 discontinuous. In the manufacturing process of the retainer bearing, it can be formed with a continuous thread on a cylindrical body and, thereafter, the retainer bearing is machined to form the four flat sides 42-45 with removal of the portions of the thread at the flat sides, although complete removal is not essential. The objective is to provide a space in the bore 17 of the housing between the wall thereof and one of the flat sides 42-45 of the retainer bearing. The retainer bearing also has a plurality of spanner wrench slots 50-53 at an end thereof and associated one with each of the flat sides 42-45.

As illustrated in FIG. 4, an initial part of the assembly operation comprises the insertion of the worm gear shaft 25 into the bore 17 of the housing to a fully seated position, placement of the wave washer 30 onto the worm gear shaft and movement thereof to a position abutting the shoulder 31 and, thereafter, placement of the retainer bearing 28 onto the worm gear shaft. The retainer bearing is then threaded into the internal thread 18 of the bore by use of a standard air-driven tool having teeth which engage within a pair of the spanner wrench slots of the retainer bearing. The tool rotates the retainer bearing inwardly to stall torque which, in the process, compresses the wave washer 30 against the shoulder 31 of the worm gear shaft. At this point in the assembly operation, it would be difficult to rotate the worm gear shaft 25.

A tool, indicated generally at 60 in FIG. 6, is used in further steps of the assembly operation. This tool has a guide block 61 with a flange 62 having an opening which is generally U-shaped in configuration and matched to the exterior shape of the housing part 16 whereby the guide block can fit onto the housing part 16 in only one position. This flange is shown in broken line in FIG. 8 and has a top lateral part 63 and side parts 64 and 65. The guide block 61 rotatably mounts drive means including a tool shaft 70. The tool shaft 70 is rotatable within the guide block and captured against longitudinal movement by a plate 71 at one end of the shaft rotatably abutting a shoulder of the guide block and pin means 72 extended through an opening in the tool shaft 70 and which movably engage against a plate 73 mounted at an end of the guide block. The plate 73 is held in position by a pair of threaded members 74 and 75 whose heads function as stops in a manner to be described. The plate 71 has a pair of spanner teeth 80 and 81 for movement into interengaging relation with a pair of the spanner wrench slots 50-53 of the retainer bearing 28.

The tool shaft 70 is urged in a clockwise direction, as viewed in FIG. 8, by a coil spring 85 having one end 86 attached to the tool shaft 70 and an opposite end 87 captured by the guide block 61. The pin means 72 extends to opposite sides of the tool shaft 70 and the normal position of the tool shaft is that shown in FIGS. 7 and 8 wherein the spring 85 urges the opposite ends of the pin means 72 into engagement with the heads of the threaded members 74 and 75.

With the tool 60 oriented as shown in FIGS. 7 to 9, the spanner teeth 80 and 81 are not in position to engage within any of the spanner wrench slots of the retainer bearing and, thus, the guide block 61 is shown spaced from the end of the housing part 16. With the guide block 61 held in one hand and urged toward the housing part 16, the tool shaft 70 is rotated in a counterclockwise direction by engagement with a member 90 mounted at the end of the tool shaft and shortly after the beginning of the rotation, the spanner teeth 80 and 81 will come into alignment with a pair of spanner wrench slots of the retainer bearing whereby they can move into interengagement therewith and the guide block 61 can fully seat against the housing part 16. The rotation of the tool shaft 70 continues to the position illustrated in FIGS. 10 and 11 wherein the pin means 72 come into contact with the heads of the threaded members 74 and 75 defining the stops. With this rotation of the tool shaft being less than one-half of a revolution, the spanner tooth 80 has brought the spanner wrench slot 53 to the position shown in FIG. 10 and has brought the spanner wrench slot 50 into juxtaposition with a particular staking area location on the housing 10. The tool can then be removed from the housing and the spring 85 thereof returns the tool shaft 70 to the rotative position illustrated in FIG. 8.

The slight backing-off of the retainer bearing 28 relaxes the wave washer 30, as shown in FIG. 10, to free the worm gear shaft 25 for rotation in addition to rotatably orienting the retainer bearing. A staking process is then carried out in a stake press wherein a stake punch is driven into the metal of the housing at the stake area to form a stake upset 95 and locally deform the housing material to force material inwardly and form the upset housing material 36 which, as shown in FIGS. 2 and 3, extends into the space between a flat side of the retainer bearing and the internal thread of the housing bore 17 and also into the spanner wrench slot 50 to securely lock the retainer bearing in final position. This operation results in only a minimal effect on the external appearance of the housing 10.

From the foregoing, it will be evident that the rotative position of the retainer bearing 28, when fully seated in the bore 17 of the housing, is immaterial, since the tool 60 will operate to pick up the retainer bearing 28 in any rotative position and bring a flat side and associated spanner wrench slot to a specific location of the housing to assure that the staking process can flow material into interlocking relation with the retainer bearing and with a minimum deformation of the housing.

I claim:

1. A bearing assembly comprising, a housing having a bore with an internal thread adjacent the outer end thereof, a cylindrical retainer bearing having an external thread threaded into said bore, said retainer bearing having a flat side at an outer end thereof to define a space between said internal thread and the retainer bearing and a spanner wrench slot at an end of said flat side located at a predetermined rotative position in said bore to be laterally adjacent a stake location on the housing, and a localized deformation of the housing at the stake location defined by deformed material positioned in said space and said spanner wrench slot to lock the retainer bearing in position.

2. A bearing assembly as defined in claim 1 wherein said retainer bearing has a plurality of flat sides with each having a spanner wrench slot at an end thereof.

3. A window operator having a housing with a bore to receive a worm gear shaft and a tubular retainer bearing threaded into the bore to rotatably support the worm gear shaft and maintain the worm gear shaft in the bore, the improvement comprising: said retainer bearing having plural flat sides extending to an outer end thereof to define spaces between the retainer bearing and the bore and having an equal number of spanner wrench slots at an end thereof associated one with each of said flat sides whereby rotation of the retainer bearing in said bore for less than one revolution can bring a spanner wrench slot and a flat side to a particular location relative to the housing for flow of housing material toward the flat side into one of said spaces and one of the spanner wrench slots to lock the bearing in said bore.

4. A window operator having a housing having at least a part thereof of deformable metal with a bore having an internal thread at an outer end thereof, a worm gear shaft positioned in said bore, a retainer bearing with an external thread threaded into said bore for rotatably supporting and maintaining the worm gear shaft in position, and means locking the retainer bearing against rotation in said bore including a flat side on the exterior of the retainer bearing extending to the outer end of said retainer bearing to define a space between the retainer bearing and said bore, and material of the housing deformed by staking extending into said space.

5. A window operator as defined in claim 4 including a spanner wrench slot at the end of the flat side, and housing material in said spanner wrench slot.

6. A window operator as defined in claim 5 wherein said retainer bearing has four flat sides each with a spanner wrench slot at an end thereof, and the housing has a single staking location whereby the retainer bearing may be rotated less than one full revolution to align a flat side with said stake location.

* * * * *